(No Model.)   3 Sheets—Sheet 1.

H. O. PEABODY.
FERTILIZER DISTRIBUTER.

No. 309,404.   Patented Dec. 16, 1884.

Witnesses:
Sigourney Wales
Walter E. Lombard

Inventor:
Henry O. Peabody,
by N. C. Lombard
Attorney.

(No Model.)  3 Sheets—Sheet 2.

H. O. PEABODY.
FERTILIZER DISTRIBUTER.

No. 309,404. Patented Dec. 16, 1884.

Witnesses:
Sigourney Wales
Walter E. Lombard

Inventor:
Henry O. Peabody,
by N. C. Lombard
Attorney.

UNITED STATES PATENT OFFICE.

HENRY O. PEABODY, OF BOSTON, MASSACHUSETTS.

FERTILIZER-DISTRIBUTER.

SPECIFICATION forming part of Letters Patent No. 309,404, dated December 16, 1884.

Application filed June 6, 1884. (No model.)

*To all whom it may concern:*

Be it known that I, HENRY O. PEABODY, of Boston, in the county of Suffolk and State of Massachusetts, have invented certain new and useful Improvements in Fertilizer-Distributers, of which the following, taken in connection with the accompanying drawings, is a specification.

My invention relates to machines for spreading or distributing fertilizers of that class which are used in a finely-pulverized form; and it consists in certain novel constructions, arrangements, and combinations of parts, which will be readily understood by reference to the description of the drawings, and to the claims to be hereinafter given.

Figure 2:
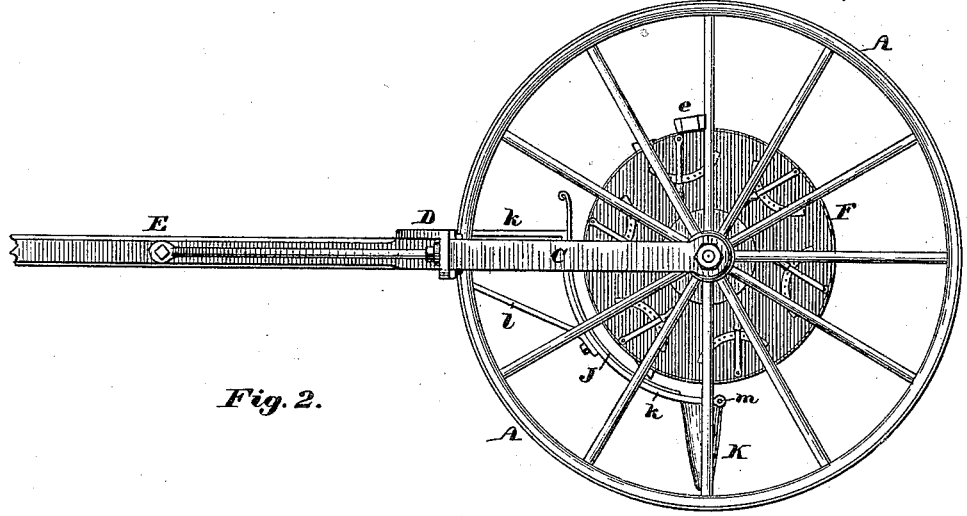
Figure 1:
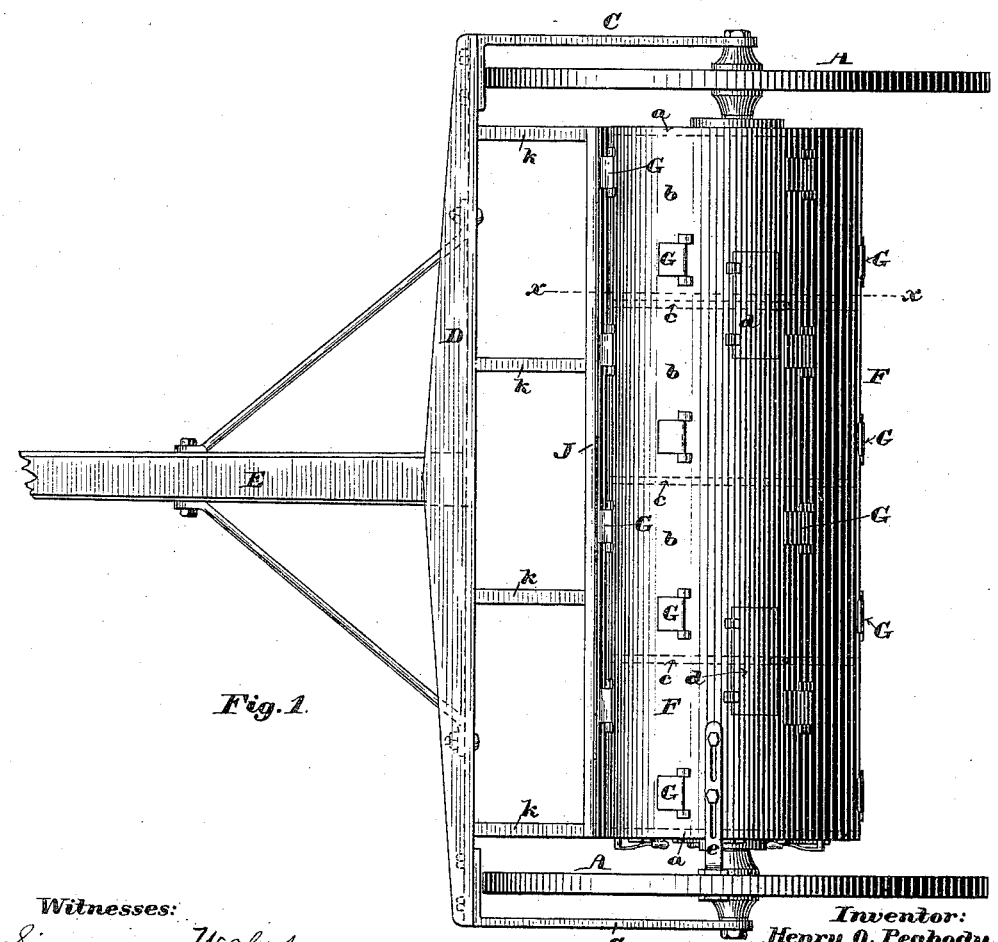
Figure 3:
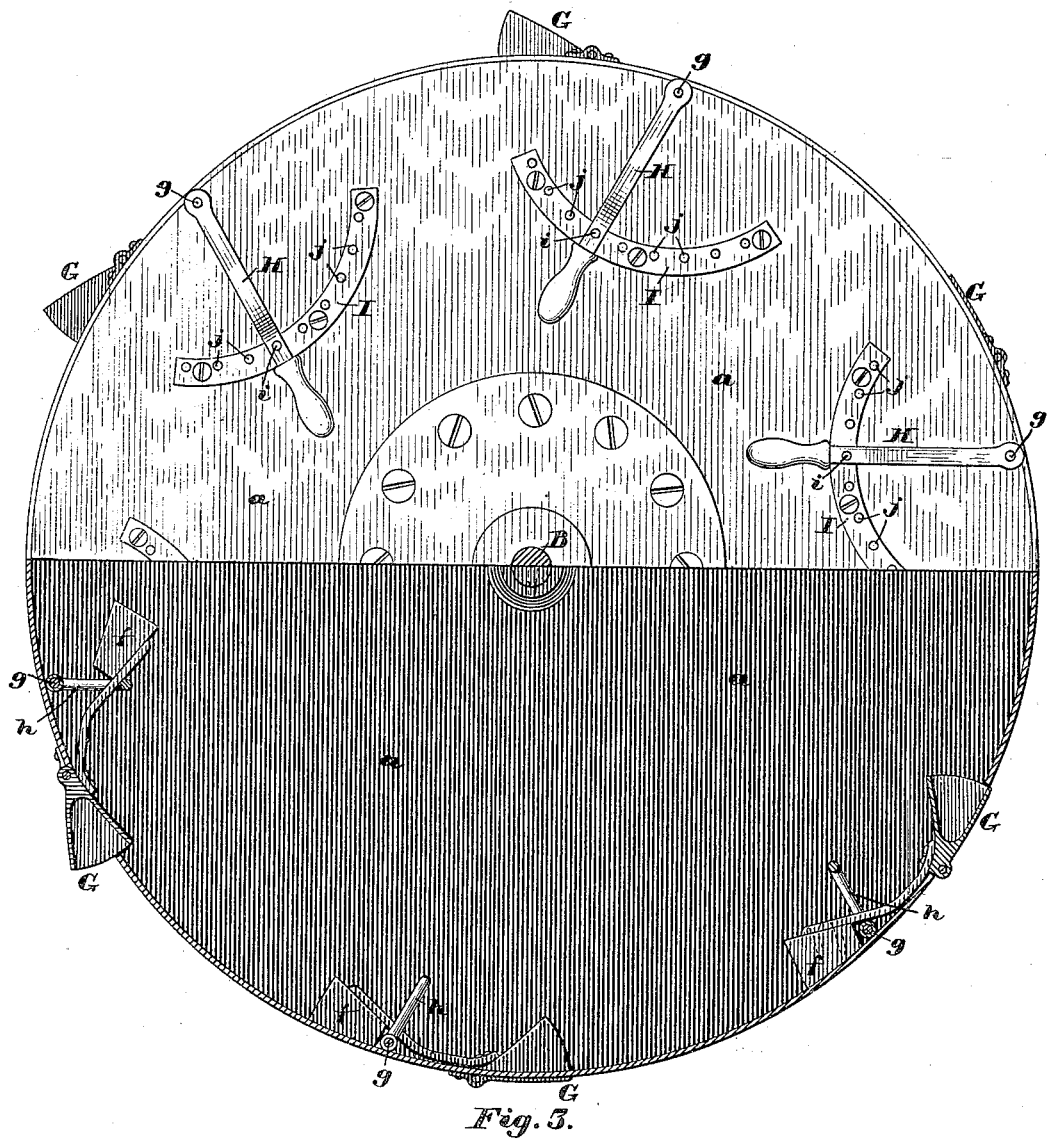

Figure 1 of the drawings is a plan of so much of a machine as is necessary to illustrate my invention. Fig. 2 is a side elevation of the same. Fig. 3 is a sectional end elevation of the cylinder drawn to an enlarged scale, the cutting-plane of the lower half thereof being on line *x x* on Fig. 1; and Fig. 4 is a central longitudinal section of a portion of the cylinder drawn to the same scale and illustrating the manner of mounting it upon the axle.

Figure 4:
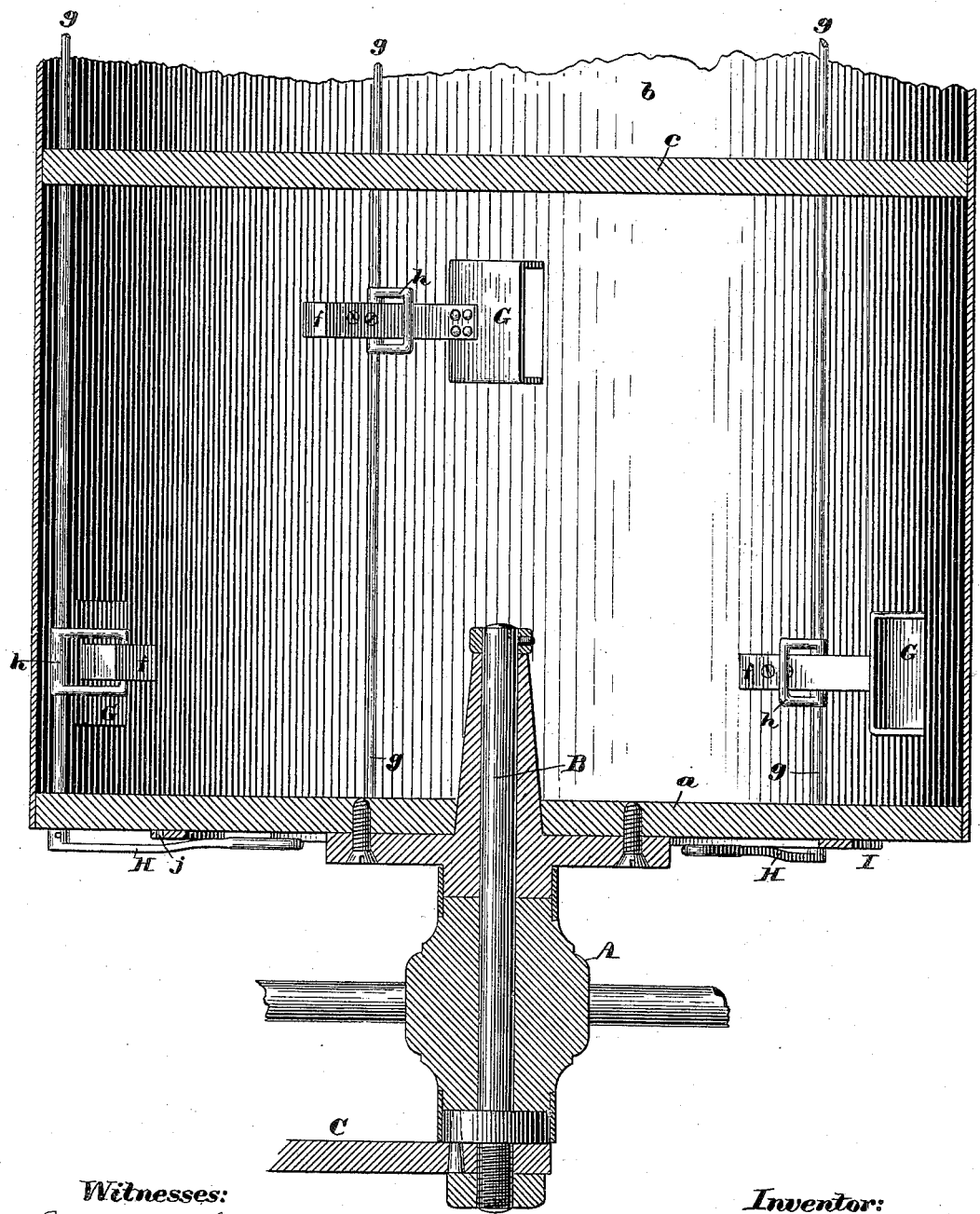

A A are the rear wheels of the distributer, mounted upon short axles B B, firmly fixed in the arms C C of the carriage-frame, and projecting inward therefrom, as shown in Fig. 4. The arms C C are firmly secured to the cross-bar D, which has secured thereto the perch or pole E, which may be connected to the axle of a pair of forward wheels, (not shown,) or it may serve as a pole for harnessing a pair of horses without the intervention of the forward wheels. The axles B B have mounted upon their inner ends the cylinder F, composed of the heads *a a*, shell *b*, and partitions *c c c*, and is provided in its periphery with two openings, each communicating with two of the compartments into which said cylinder is divided, and closed with a hinged door, *d*, as shown in Fig. 1, by means of which the fertilizer to be distributed may be placed within said cylinder. The cylinder F is mounted loosely upon the axles B B, so that it may be revolved thereon, and is provided with the adjustable bar *e*, arranged to project outward therefrom between the spokes of one of the wheels A, so as to compel the cylinder to revolve with the wheel; or said bar *e* may be withdrawn from between the spokes, so that the wheels may revolve while the cylinder remains stationary. The cylinder F is also provided with a series of buckets, G, pivoted to its shell, and each arranged to vibrate about its pivot through an opening cut through said cylinder-shell, and provided with a counterpoise-weight, *f*, by which it is held in a position with its mouth within the cylinder, while it is at or near the lower side of said cylinder and during its passage from said lowest position to a point near the upper side or highest part of said cylinder, and vibrated to a position with its mouth outside of the shell of said cylinder when nearing said highest part of said cylinder, and maintained in such position till the cylinder has revolved, so as to bring said bucket to a point near the lowest point in its revolution again, when the force of gravity acting upon the counterpoise-weight *f* causes the bucket to be again vibrated about its pivot to a position with its mouth within the casing of the cylinder, as at the start, this inward and outward movement of each bucket taking place once to each revolution of the cylinder F, the buckets being filled with the fertilizer contained in said cylinder during the upward movement of said buckets and discharged upon the ground or outside of the cylinder during the downward movement of said buckets in an obvious manner.

In order to regulate the amount of fertilizer discharged at each revolution of the cylinder, I mount in suitable bearings in the heads *a a* and partitions *c c c*, just within the shell or casing *b*, a series of shafts, *g g*, one to each longitudinal row of buckets G, and mount upon each of said shafts as many stirrups or loop-shaped levers, *h*, as there are buckets in each longitudinal row, said stirrups being so arranged relative to said buckets as to encompass or pass around the weighted arms thereof, as shown in Figs. 3 and 4. Each of the shafts *g* has secured to one end thereof, outside of the cylinder F, a spring detent-lever, H, provided with a pin, *i*, projecting slightly from the inner surface of said lever, and arranged to engage with either one of a series of holes, *j j*, formed in a segmental plate, I, secured to the cylinder-head, as shown in Figs. 3 and 4. By adjusting the stirrups h h to different angles the amount of vibration of the buckets G, and the consequent width of mouth of each of said buckets which will be exposed outside of the cylinder shell or casing, may be readily determined, so that said buckets may be made to discharge their entire contents outside of the cylinder or only a portion thereof, while the remainder is discharged within the cylinder, as will be readily understood by reference to the bucket shown in section on the left of Fig. 3.

J is a curved metallic apron placed in front of and extending partially beneath the cylinder F, and supported by the bars k k and braces l in a position to receive the fertilizer as it is discharged from the buckets G.

K is a chute, made, preferably, of canvas and suspended from the bars k k, which extend beyond the lower edge of the apron J, a rod mounted in the ends of said bars at m, and from the lower edge of the apron J, into and through which the fertilizer falls from the lower edge of the apron J in its passage to the ground. The object of the chute K is to prevent the falling material from being injuriously affected by the wind.

What I claim as new, and desire to secure by Letters Patent of the United States, is—

1. The combination of the hollow revolving cylinder F, one or more buckets, G, provided with the counterpoise-weight f, and one or more pivoted and adjustable stirrups, h, arranged and adapted to limit the movement of the counterpoise-weights f, substantially as described.

2. The combination of the hollow revolving cylinder F, one or more buckets, G, provided with the counterpoise-weight f, the shaft g, one or more stirrups, h, and the detent-lever H, arranged and adapted to engage with a series of holes, substantially as described.

3. The combination of the hollow revolving cylindrical hopper F, the pivoted and vibrating buckets G, the apron J, and the chute K, all arranged and adapted to operate substantially as described.

In testimony whereof I have signed my name to this specification, in the presence of two subscribing witnesses, on this 3d day of June, A. D. 1884.

HENRY O. PEABODY.

Witnesses:
 N. C. LOMBARD,
 WALTER E. LOMBARD.